United States Patent [19]

Katsumata et al.

[11] Patent Number: 5,290,163

[45] Date of Patent: Mar. 1, 1994

[54] METAL MOLD FOR VULCANIZING A TIRE

[75] Inventors: Shiro Katsumata; Takehiro Kata, both of Tokyo, Japan

[73] Assignee: Bridgestone Corporation, Tokyo, Japan

[21] Appl. No.: 883,490

[22] Filed: May 15, 1992

[30]  Foreign Application Priority Data

May 17, 1991 [JP] Japan ................................. 3-140749

[51] Int. Cl.⁵ ...................... B29C 33/42; B29C 35/02; B29D 30/04
[52] U.S. Cl. ......................................... 425/47; 425/49; 425/54; 425/55; 425/183; 425/186
[58] Field of Search ....................... 425/85, 47, 49, 54, 425/55, 56, 57, 192 R, 451.9, 183, 186; 249/56, 57, 160, 161, 162

[56]  References Cited

U.S. PATENT DOCUMENTS

| 3,999,907 | 12/1976 | Pappas | 425/47 |
| 4,411,175 | 10/1983 | Takahashi et al. | 29/416 |
| 5,190,767 | 3/1993 | Beres et al. | 425/54 |

FOREIGN PATENT DOCUMENTS

| 1085531 | 2/1955 | France | 425/47 |
| 51-119776 | 4/1976 | Japan . | |
| 56-58817 | 5/1981 | Japan . | |
| 2-17311 | 2/1990 | Japan . | |
| 2-220732 | 9/1990 | Japan . | |
| 588170 | 5/1947 | United Kingdom | 425/47 |

*Primary Examiner*—Khanh Nguyen
*Attorney, Agent, or Firm*—Sughrue, Mion, Zinn, Macpeak & Seas

[57]  ABSTRACT

An annular metal mold portion forming a tire tread is constructed by assembling a plurality of sector metal molds 2 severed in the circumferential direction, and all or some of the sector metal molds 2 are constructed of a plurality of smaller parts 3 severed in the axial direction as well as in the circumferential direction. Joining surfaces between the sector metal molds themselves each consisting of a plurality of smaller parts are formed of contour surfaces in arbitrary shape of the smaller parts. These contour surfaces are such curved surfaces that at every location a radius of curvature is 5 mm or larger and an inclination angle of a tangential plane with respect to a tire axis is 80 degrees or less.

5 Claims, 6 Drawing Sheets

METAL MOLD FOR VULCANIZING A TIRE

BACKGROUND OF THE INVENTION

The present invention relates to an annular metal mold for vulcanizing and shaping an unvulcanized green tire. More particularly it relates to such annular metal mold which is composed of a combination of sector metal molds.

A tire vulcanizing metal mold has various protrusion patterns formed on its surface, and a groove pattern of a tire tread portion is formed by pressing a green tire onto this metal mold surface.

However, at the time of pressing a green tire onto a metal mold surface, air is apt to be confined between the metal mold surface and the green tire. Since a pattern is formed on a metal mold surface by protrusions, an escape path of air is blocked by these protrusions and a green tire, resulting in air traps, hence bares (recesses) are produced on a tire surface by these air traps. The commercial value of the tire is degraded.

Therefore, it has been a common practice to sever an annular metal mold into a plurality of smaller parts and to extract air by making use of gap clearances between adjacent smaller parts for preventing production of bares. In this case, each of the sector metal molds formed by severing an annular metal mold along the circumferential direction is composed of the above-mentioned smaller parts, and the annular metal mold is constructed by assembling these sector metal molds.

For instance in a tire vulcanizing metal mold disclosed in Laid-Open Japanese Utility Model Specification No. 2-17311 (1990), as shown in FIG. 11 three smaller parts 02 are assembled, and their backsides are supported by a reinforcement part 03 to construct one sector metal mold 01. These sector metal molds 01 are assembled in an annular form to form an annular metal mold. On the surface of the metal mold are formed protrusions 04, and a tread pattern of a tire is formed by this protrusion pattern.

In this tire vulcanizing metal mold, the smaller parts 02 have a shape formed by cutting and severing an annular metal mold along a circumferential direction by planes containing an axis of the tire, and joining surfaces of the sector metal mold 01 also form a plane.

The cutting surfaces between the smaller parts must be selectively provided at such portions that upon pressing a green tire, air may not be confined by the protrusion pattern. In addition, they must be provided by avoiding such places that cut portions of the protrusion may become thin-walled and liable to be broken and by avoiding blades or the like.

Accordingly, if a protrusion pattern becomes complicated, as shown in FIG. 12 (disclosed in Laid-Open Japanese Patent Specification No. 56-58817 (1981)), it becomes difficult to cut an annular metal mold 010 along a plane containing a tire axis, and hence it must be cut along an oblique plane $L_2$ or a curved surface $L_3$ without being limited to a plane $L_1$ containing a tire axis.

In the example of the prior art disclosed in the above-referred Laid-Open Japanese Patent Specification No. 56-58817 (1981), smaller parts are made by cutting an annular metal mold 010 at desired cutting positions into a desired cut shape by means of a wire cutting tool.

In the case of assembling respective sector metal molds 01, an annular metal mold is constructed by making respective radially outwardly opened sector metal molds 01 slide towards their center. At this time, in order that the sector metal molds may be assembled with one another without any hindrance, joining surfaces 05 of the respective sector metal molds are formed into planes containing a tire axis as shown in FIG. 11.

It is also the same with respect to the case shown in FIG. 12, and even though smaller parts severed into arbitrary shapes are employed, for the smaller part forming a joining surface 05 of the sector metal mold, this particular joining surface 05 is formed into a plane containing a tire axis, but the other contour surfaces are formed into arbitrary shapes. Accordingly, this particular smaller part would be formed in a different shape from the other smaller parts not forming the joining surface 05 between the sector metal molds. As result, many kinds of smaller parts must be manufactured, hence working time is increased, and it becomes high in cost.

If the joining surfaces between the sector metal molds are formed in an arbitrary shape without any limitation, there is a fear that upon assembling a plurality of sector metal molds by making them slide towards the center, protrusion and recesses on the opposed joining surfaces 05 may not be well meshed with each other but may interfere with each other, resulting in damages.

Furthermore, when smaller parts are manufactured by cutting an annular metal mold into desired shapes as is the case of the above-referred Laid-Open Japanese Patent Specification No. 56-58817 (1981), special tools such as a wire cutting tool or the like are necessitated. Also it is necessary to control cutting by making use of a special program, and so, a lot of labor is necessitated for the cutting work.

The present invention has been worked out in view of the above-mentioned points, and one object of the present invention is to provide a metal mold for vulcanizing a tire, in which a plurality of smaller parts are made all in the same shape and construction time as well as a cost can be cut out, and a method for making the same metal mold.

SUMMARY OF THE INVENTION

In order to achieve the aforementioned object, according to the present invention, in a tire vulcanizing metal mold having its annular metal mold portion for forming a tread of a tire constructed by assembling a plurality of sector metal molds severed along the circumferential direction, and having all or some of the above-mentioned sector metal molds constructed of a plurality of smaller parts severed along the axial direction as well as along the circumferential direction, joining surfaces between the above-mentioned sector metal molds each consisting of the plurality of smaller parts are formed of contour surfaces in arbitrary shapes of the aforementioned smaller parts.

Since the joining surfaces of the sector metal molds are formed of contour surfaces in arbitrary shapes of the smaller parts, all the smaller parts can be formed in such shape that bares may not be produced and damages of the pattern may not be caused. Also, since it is possible to manufacture all the smaller parts in the same shape, working time can be reduced and reduction of a cost can be achieved.

In the case where the joining surfaces between the sector metal molds are curved surfaces, at every point on these curved surfaces a radius of curvature is limited to 5 mm or larger, and an inclination angle of a tangential plane with respect to a tire axis is limited to 80 degrees or less.

In addition, in the case where a sector metal mold is constructed of a plurality of smaller parts and a reinforcement part for integrally supporting and reinforcing these small parts, a displacement of the joining surface of the above-mentioned small part with respect to the small part in the adjacent sector metal mold from the joining surface of the above-mentioned reinforcement part with respect to the reinforcement part in the adjacent metal mold, is limited to 5 mm or less.

By limiting the configurations of the joining surfaces and the relative displacement between the joining surface of the smaller parts and the joining surface of the reinforcement parts in the above-described manner, upon assembling the sector metal molds, the protrusions and recesses on the respective joining surfaces would be meshed without interference. Hence damage would not be caused, and slide movement in the radial direction can be achieved smoothly.

DESCRIPTION OF THE PREFERRED EMBODIMENTS

Now description will be made on one preferred embodiment of the present invention illustrated in FIGS. 1 to 8.

Figure 1:
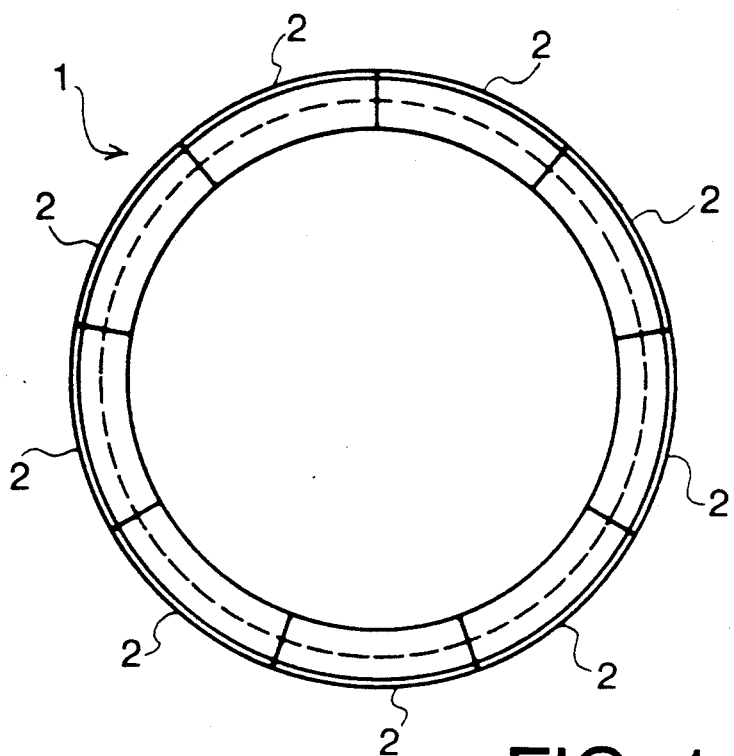
FIG. 1 is plan view of an annular metal mold forming one preferred embodiment of the present invention.
Figure 2:
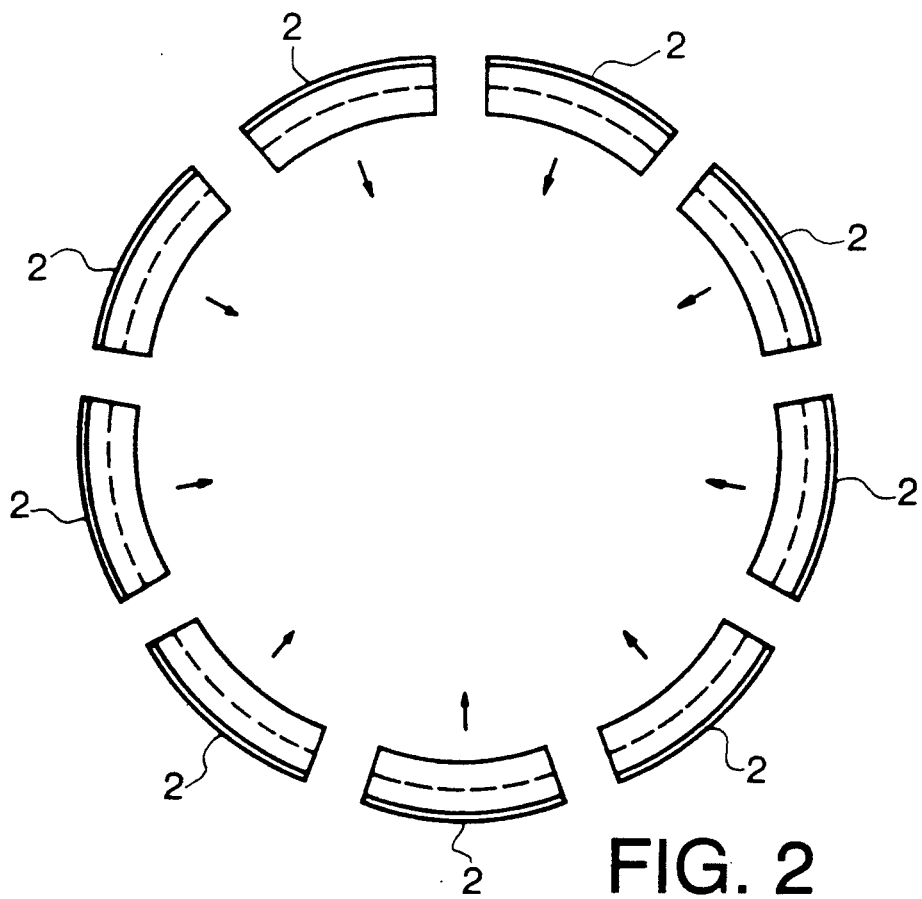
FIG. 2 is a plan view showing a state of sector metal molds forming the same annular metal mold as opened radially outwards.

FIG. 1 is a general plan view of an annular metal mold 1. The annular metal mold 1 is constructed of a plurality of sector metal molds 2, and the sector metal molds 2 can be brought into an opened state as shown in FIG. 2 by making them slide radially outwards. Also, by making the respective sector metal molds 2 in an opened state slide radially inwards, an annular metal mold 1 of ring shape as shown in FIG. 1 can be formed.

Figure 3:
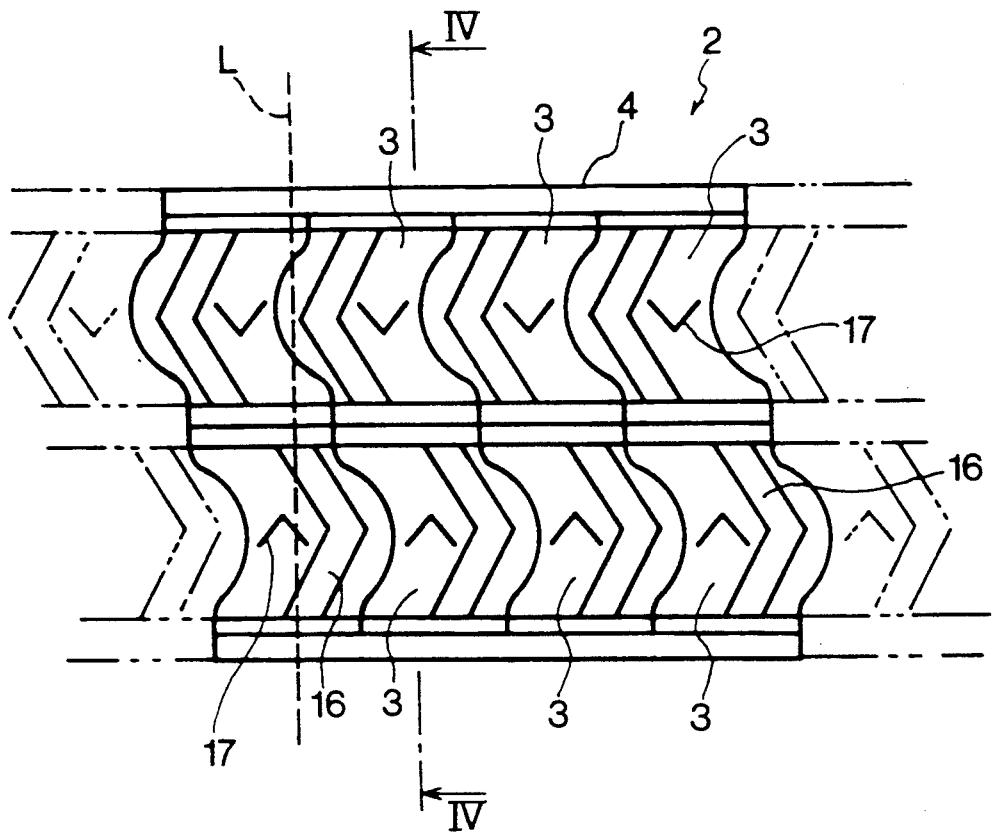
FIG. 3 is a front view of a sector metal mold.
Figure 4:
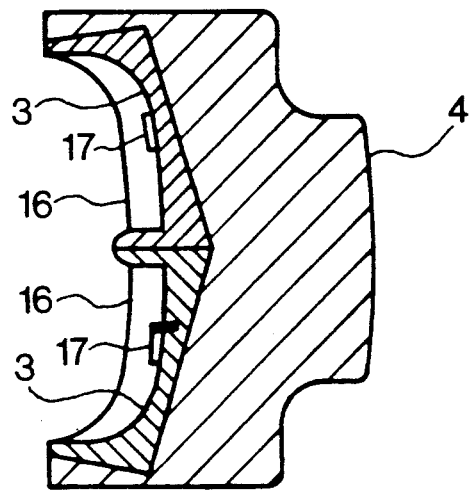
FIG. 4 is a cross-section view taken along line IV—IV in FIG. 3.

Each of the sector metal molds 2 is formed of a plurality of smaller parts 3 and a reinforcement part 4 for supporting an assembly of smaller parts 3 from their backside as shown in FIGS. 3 and 4.

The smaller parts 3 are arrayed in two upper and lower levels, the butting surfaces between vertically contiguous smaller parts 3 form planes, but the butting surfaces between horizontally contiguous smaller parts 3 form curved surfaces. The smaller parts 3 all have the same configuration and they are preliminarily individually manufactured.

Figure 5:
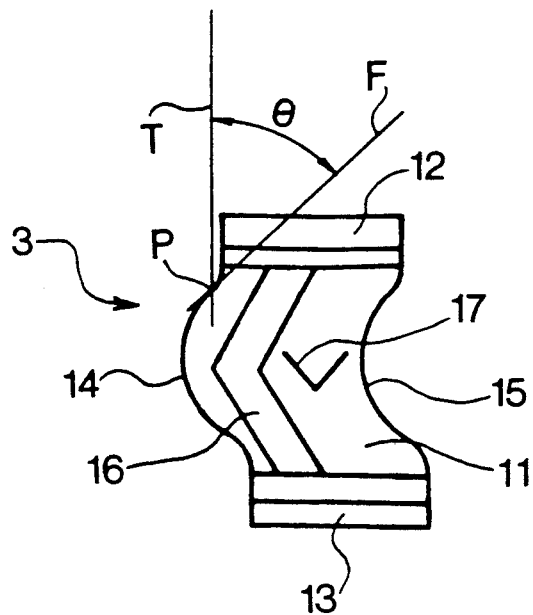
FIG. 5 is a front view of a smaller part.
Figure 6:
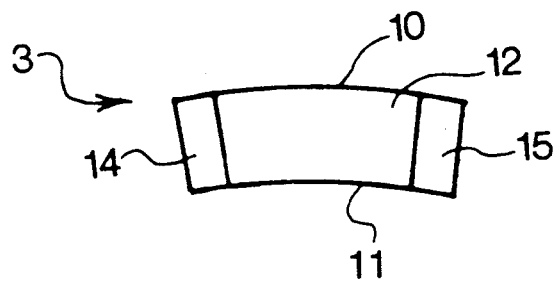
FIG. 6 is a plan view of the same smaller part.
Figure 7:
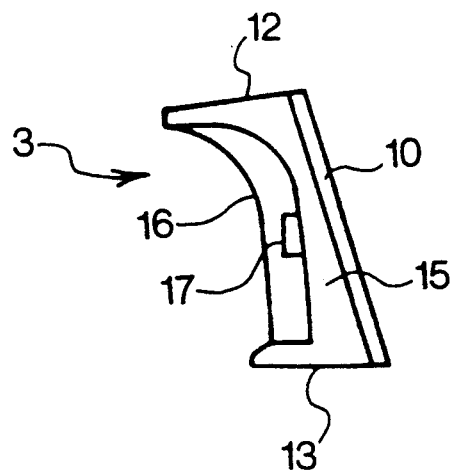
FIG. 7 is a side view of the same smaller part.

The configuration of the smaller part 3 at the upper level is illustrated in FIGS. 5 to 7. An outer circumferential surface 10 of the smaller part 3 forms a cylindrical surface having its center axis aligned with the center axis of the annular metal mold 1 (FIG. 6). On its inner circumferential surface 11 is formed a protrusion pattern (FIG. 5). Upper and lower surfaces 12, 13 of the smaller part 3 are not parallel to each other, but they are planes inclined with respect to each other to converge towards the inside (FIGS. 4 and 7).

The side surfaces 14 and 15 respectively butting against lefthand and righthand contiguous smaller parts are curved surfaces of the same shape, although the side surface 14 is convex but the side surface 15 is concave. These convex surfaces and concave surfaces respectively fit in the corresponding concave surface and convex surface of the contiguous smaller parts.

On the inner circumferential surface 11 of the smaller part 3 are provided lug protrusions 16 forming grooves of a tire tread and blades 17, and thus a pattern is formed.

The left and right surfaces 14 and 15 forming a contour of the smaller part 3 are formed in an optimum curved configuration at selected positions where bares may not be produced by the protrusion pattern while avoiding the positions of the above-described lug protrusions 16 and blades 17. Since a plane severing a lug protrusion 16 or a blade 17 at its midway as shown, for instance, by broken line L in FIG. 3, is not employed as a severing surface, damage of a lug protrusion 16 or a blade 17 can be prevented.

Furthermore, the curved surfaces forming the side surfaces 14 and 15 are chosen in such a manner that at every point on that curved surface a radius of curvature may become 5 mm or larger. Also, these curved surfaces are chosen in such manner that an inclination angle of a plane tangential to the curved surface with respect to the center axis of the annular metal mold 1, that is, an axis of a tire to be mounted to this metal mold may become 80 degrees or less at every point on these curved surfaces. In FIG. 5, reference character F designates a tangential plane at a point P on the side surface 14, reference character T designates a straight line that is parallel to the tire axis, and reference character $\theta$ designates the above-described inclination angle. Since it was assumed that the curved surface of the side surface 14 is a curved surface created by translating the illustrated circular arc-shaped curve in parallel in the radial direction of the annular metal mold, the tangential plane F is illustrated as a tangential line with respect to the above-mentioned circular arc-shaped curve.

Side surfaces of the sector metal mold 2 serving as joining surfaces are formed on the side surfaces 14 and 15 themselves of the smaller part 3.

A reinforcement part 4 for supporting a plurality of smaller parts 3 as described above from their backside is provided for each sector metal mold. In the reinforcement part 4 is formed an inner circumferential groove having a cross-section configuration of the smaller parts 3 as vertically stacked in the manner shown in FIG. 4. The reinforcement member 4 holds the smaller parts 3 while clamping the upper and lower surfaces 12 and 13 of the smaller parts 3 inclined inwardly with respect to each other as described above, from the above and the below. Accordingly, when the smaller parts 3 are to be fit into the reinforcement part 4, the smaller parts 3 are inserted through a groove opening on the side surface of the reinforcement part 4.

Figure 8:
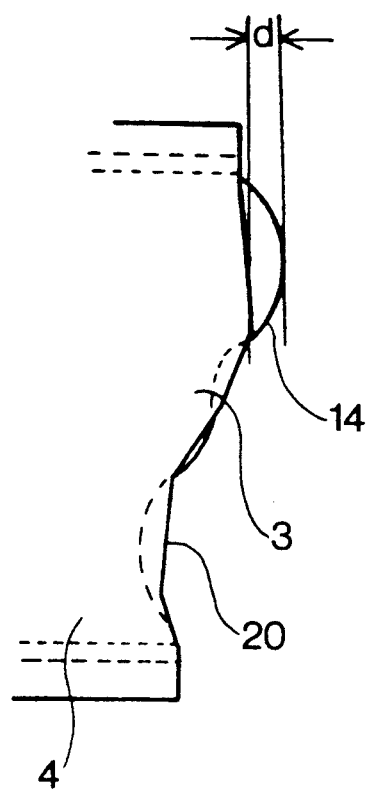
FIG. 8 is a rear view of an essential portion of the sector metal mold.

Side surfaces 20 where the reinforcement parts 4 butt against each other, are somewhat different from the side surfaces 14, 15 of the smaller parts 3 as shown in FIG. 8 which is a rear view of an essential portion of the sector metal mold as viewed from its backside, that is, from the side of the outer circumference of the annular metal mold and there recesses and protrusions are formed more smoothly. However, these side surfaces 20 are formed in such manner that a maximum displacement width d of them from the side surfaces 14 and 15 of the smaller part 3 may become 5 mm or less.

A sector metal mold 2 is formed by fitting four smaller parts 3 into each of the upper and lower portions of such reinforcement part 4. These sector metal molds 2 are separately arrayed in a radial manner as shown in FIG. 2, then these are made to slide simultaneously towards the center, and the joining surfaces of the sector metal molds respectively consisting of the side surfaces 14 and 15 of the smaller parts 3 and the side surfaces 20 of the reinforcement parts 4 are made to butt against one another to construct the annular metal mold 1 shown in FIG. 1.

On the curved surfaces of the side surfaces 14 and 15 of the smaller parts 3, since the radius of curvature is limited to 5 mm or lager and the inclination angle θ of the tangential plane is limited to 80 degrees or less, there is no place where a part of the surface protrudes extremely, and also the displacement width d from the side surface 20 of the reinforcement part 4 is also limited to 5 mm or less. Accordingly, the inconvenience that when the sector metal molds 2 contiguous to one another are made to slide towards the center and their side surfaces butt against one another, the joining surfaces of the sector metal molds 2 may partly interfere with one another and may be damaged, or the slide movement cannot be achieved smoothly, can be prevented.

With regard to the smaller parts 3, since a large number of smaller parts 3 having the same configuration are preliminarily individually manufactured, the working is easier than manufacturing the smaller parts by cutting an annular metal mold, and hence reduction of a cost can be achieved.

It is to be noted that modification can be made in such manner that a number of kinds of smaller parts having different protrusion patterns, although the general configuration is the same, are prepared and the pattern is partly varied.

While the entire tire tread portion is formed of the smaller parts 3 in the above-described preferred embodiment, modification can be made in such manner that a part of the tire tread may be formed by the reinforcement part. One example of the modified embodiment is shown in FIGS. 9 and 10.

Figure 9:
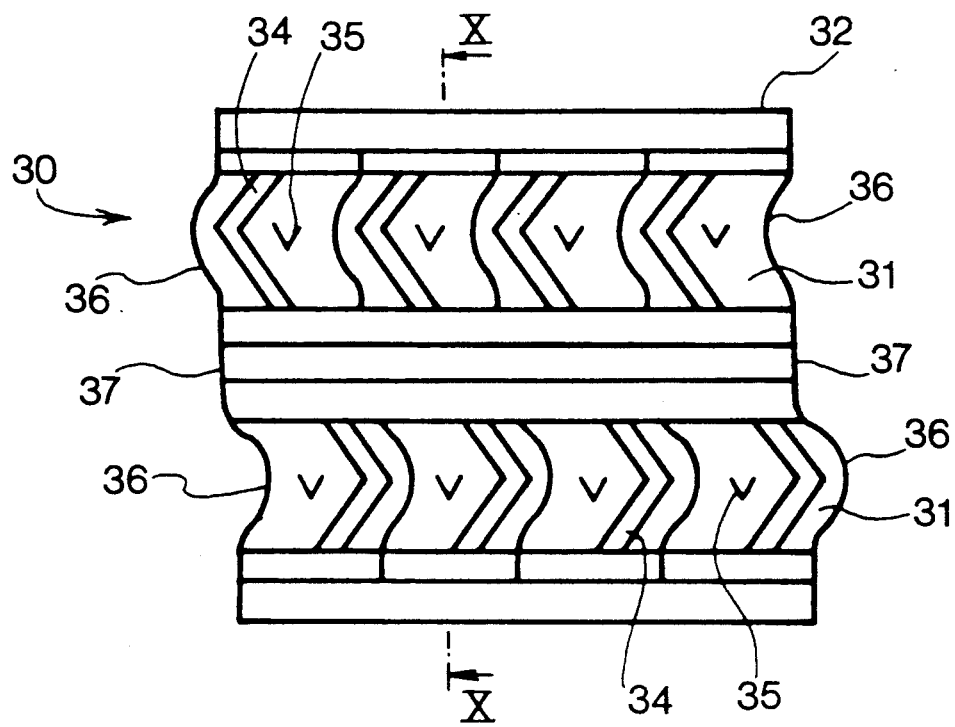
FIG. 9 is a front view of a sector metal mold according to another preferred embodiment of the present invention.
Figure 10:
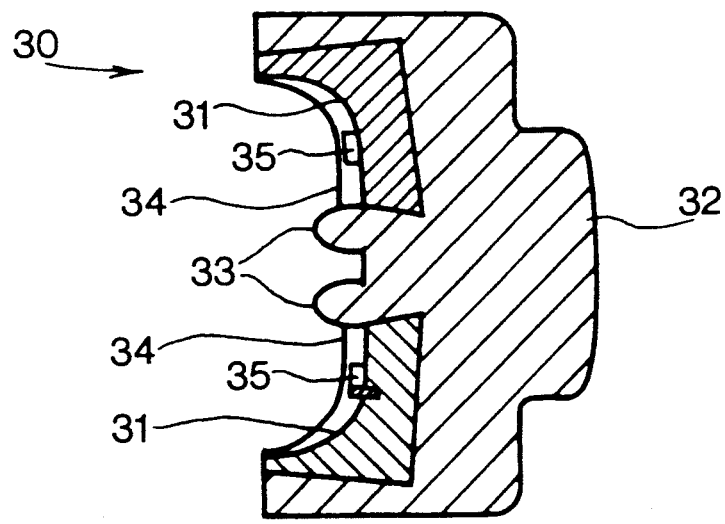
FIG. 10 is a cross-section view taken along line X—X in FIG. 9.
Figure 11:
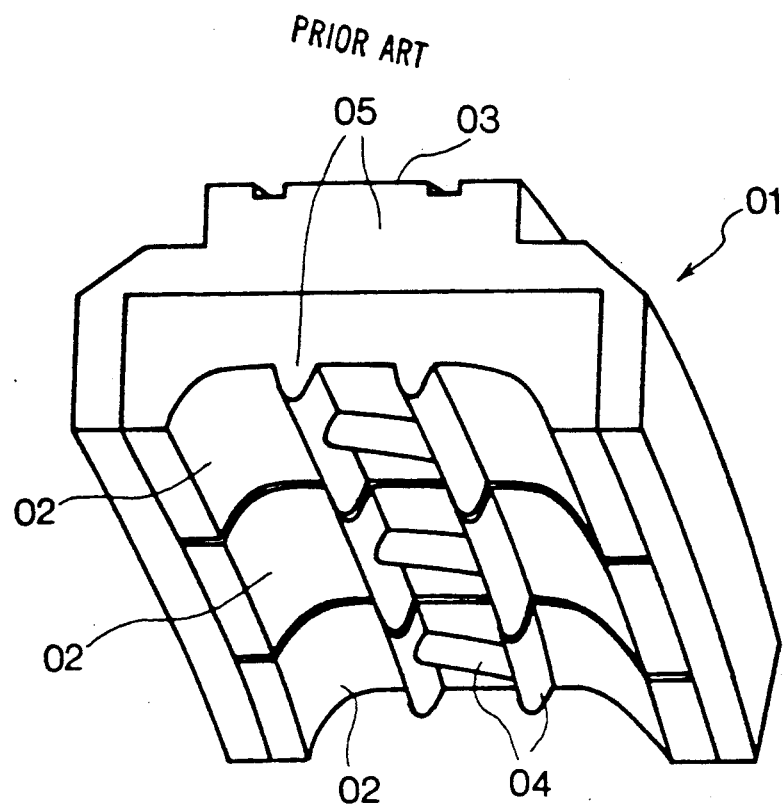
FIG. 11 is a perspective view of a sector metal mold in the prior art.
Figure 12:
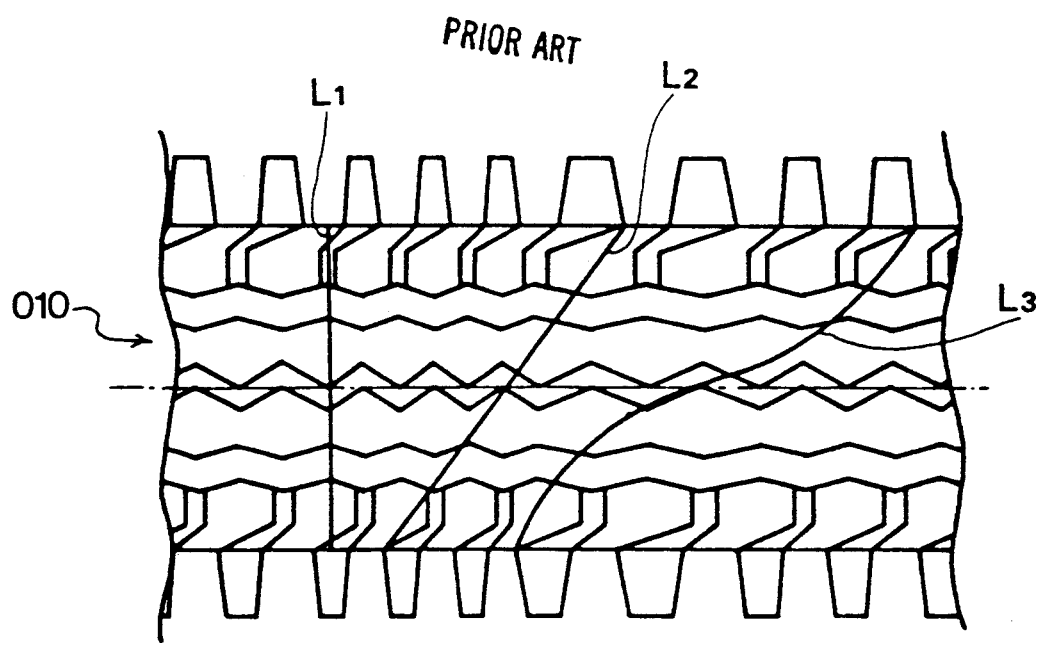
FIG. 12 is a front view illustrating severing lines of a metal mold in the prior art.

FIGS. 9 and 10 are a front view and a cross-section view of a sector metal mold 30. On a reinforcement part 32 for supporting smaller parts 31 from the backside is formed a protrusion 33 at the center of its inner circumferential surface as directed in the circumferential direction. The smaller parts 31 are fitted in upper and lower grooves partitioned from each other by the protrusion 33.

When the smaller parts 31 having the same configuration are disposed as fitted in the upper and lower grooves, respectively, a projected end portion of the protrusion 33 forms a protrusion pattern jointly with the lug protrusion 34 and the blades 35 of the smaller parts 31.

In the case where it is more advantageous to machine a part of the reinforcement part 32 so that the protrusion pattern may be partly constructed of the reinforcement part 32 than to machine the smaller parts so that the protrusion pattern may be constructed of only the smaller parts, a metal mold having the above-described construction is conceived. In this case the metal mold joining surfaces butting against each other of the sector metal molds are formed of side surfaces 36 of the smaller parts 31 and side surfaces 37 of the protrusions 33 of the reinforcement part 32.

What is claimed is:

1. A metal mold for vulcanizing a tire comprising; an annular metal mold proton for forming a tread of a tire, said mold portion having a plurality of sector metal molds each severed along a mold circumferential direction, said metal mold having all or some of said sector metal molds constructed of a plurality of smaller parts severed along a mold axial direction as well as along the mold circumferential direction; and joining surfaces between adjacent sector metal molds consisting of said plurality of smaller parts formed on a contour surface of said smaller parts, wherein said contour surfaces are curved surfaces, and said curved surfaces are formed such that at every point on said curved surfaces a radius of curvature is 5 mm or larger and an inclination angle of a tangential plane contacting said point with respect to a tire axis is 80 degrees or less.

2. A metal mold for vulcanizing a tire as claimed in claim 1, wherein said sector metal mold constructed of said plurality of smaller parts comprises said smaller parts and a reinforcement part for integrally supporting and reinforcing the smaller parts from the backside.

3. A metal mold for vulcanizing a tire comprising; an annular metal mold portion for forming a tread of a tire, said mold portion having a plurality of sector metal molds each severed along a mold circumferential direction, said metal mold having all or some of said sector metal molds constructed of a plurality of smaller parts severed along a mold axial direction as well as along the mold circumferential direction; and joining surfaces between adjacent sector metal molds consisting of said plurality of smaller parts formed on a contour surface of said smaller parts and, a reinforcement part for integrally supporting and reinforcing the smaller parts from the backside, wherein said joining surfaces include joining surfaces for adjacent smaller parts and joining surfaces of the reinforcement part and the joining surfaces of the reinforcement part are smoother than the joining surfaces of the smaller parts.

4. A metal mold for vulcanizing a tire as claimed in claim 3, wherein said contour surfaces are curved surfaces, and these curved surfaces are such that at every point on said curved surfaces a radius of curvature is 5 mm or larger and an inclination of a tangential plane with respect to a tire axis is 80 degrees or less.

5. A metal mold for vulcanizing a tire as claimed in claim 3, wherein a relative displacement between a joining surface of said smaller part with respect to the smaller part of the contiguous sector metal mold and a joining surface of said reinforcement part with respect to the reinforcement part of the contiguous sector metal is limited to 5 mm or less.

* * * * *